(12) United States Patent
Tan et al.

(10) Patent No.: US 7,710,087 B2
(45) Date of Patent: May 4, 2010

(54) POWER CONVERTER AND POWER CONVERTING METHOD

(75) Inventors: Jing-Tao Tan, Shanghai (CN); Yan-Song Lu, Shanghai (CN); Qiu-Hua Zhu, Shanghai (CN); Wen-Yin Tsai, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 389 days.

(21) Appl. No.: 11/776,249

(22) Filed: Jul. 11, 2007

(65) Prior Publication Data

US 2008/0049474 A1 Feb. 28, 2008

(30) Foreign Application Priority Data

Jul. 13, 2006 (TW) ............... 95125738 A

(51) Int. Cl.
*G05F 1/40* (2006.01)
*G05F 1/613* (2006.01)
(52) U.S. Cl. ............ 323/272; 323/225; 323/290
(58) Field of Classification Search ........ 323/225, 323/271, 272, 284, 290, 351
See application file for complete search history.

(56) References Cited

U.S. PATENT DOCUMENTS

| | | | | |
|---|---|---|---|---|
| 6,043,634 A | * | 3/2000 | Nguyen et al. | 323/272 |
| 6,108,225 A | * | 8/2000 | Iwahori et al. | 363/98 |
| 7,285,941 B2 | * | 10/2007 | Cha | 323/272 |
| 2008/0253153 A1 | * | 10/2008 | Wu et al. | 363/44 |

* cited by examiner

*Primary Examiner*—Jessica Han
(74) *Attorney, Agent, or Firm*—Volpe and Koenig, PC

(57) ABSTRACT

A power converter and a power converting method are provided. The power converter for converting an ac input voltage at an input terminal thereof into an ac output voltage at an output terminal thereof includes an energy-storing inductor, a first switching circuit coupled to the energy-storing inductor to selectively switch so that the input terminal of the power converter is coupled to the energy-storing inductor, a second switching circuit coupled to the energy-storing inductor and the first switching circuit to selectively switch so that a common terminal of the power converter is coupled to the energy-storing inductor; and a third switching circuit coupled to the energy-storing inductor, the first switching circuit and the second switching circuit to selectively switch so that the output terminal of the power converter is coupled to the energy-storing inductor.

12 Claims, 10 Drawing Sheets

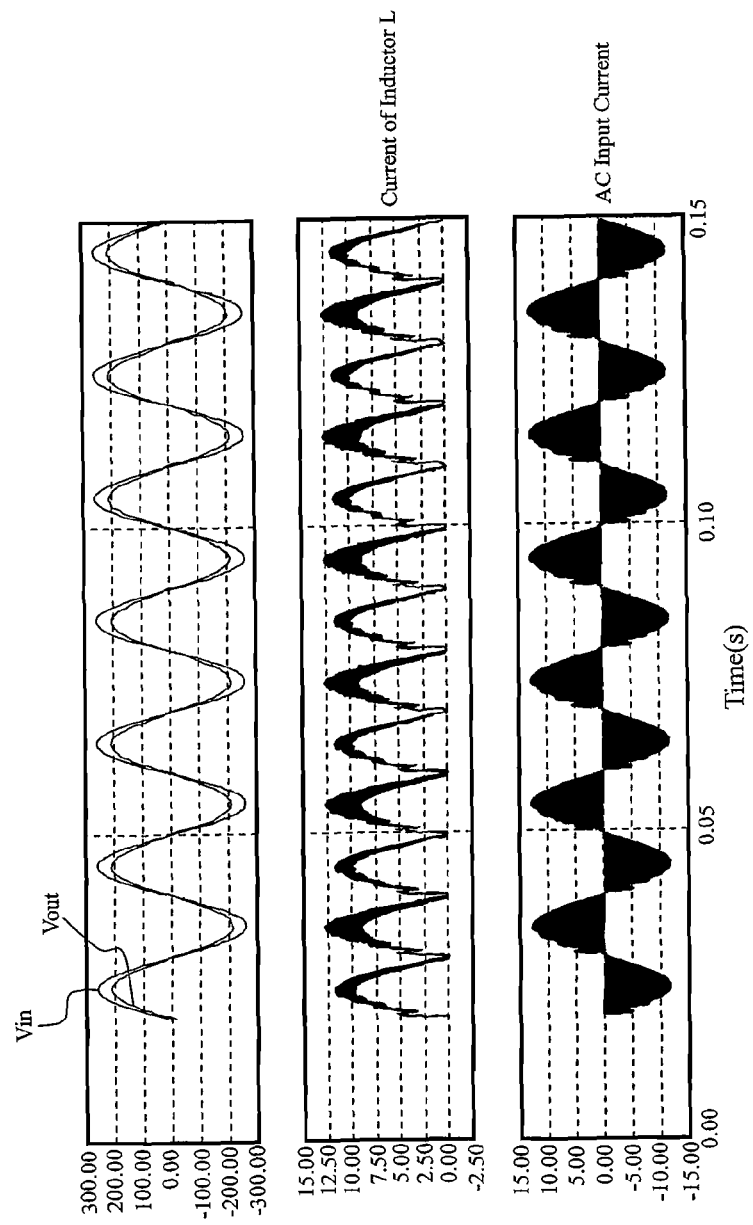

POWER CONVERTER AND POWER CONVERTING METHOD

FIELD OF THE INVENTION

The present invention relates to a power converter and a power converting method for the power converter, and more particularly to a single-phase ac/ac power converter for an uninterruptible power supply (UPS).

BACKGROUND OF THE INVENTION

Please refer to FIG. 1, which is a partial circuit diagram showing an uninterruptible power supply (UPS) according to the prior art. The UPS 1 includes an ac input voltage AC, a switch combination composed of two diodes D1 & D2, a single-phase ac/ac converter 11, an ac filter 12 composed of a filter inductor Lo and a filter capacitor Co, and a load R.

In the single-phase ac/ac converter 11, there exist an ac inductor Li, a bus capacitor Cs and three bridge arms. The switches S1 and S2 constitute a boost bridge arm, the switches S3 and S4 constitute a common bridge arm, and the switches S5 and S6 constitute a buck bridge arm.

In the UPS 1 shown in FIG. 1, on the one hand, the ac input voltage AC provides energy to the load R when the ac input voltage AC is operating normally. On the other hand, a storage battery which is not shown provides the energy to the load R when the ac input voltage AC is operating abnormally.

As to the UPS 1, the switch loss is high since one bridge arm thereof is operated with pulse width modulation (PWM) technique. Besides, the usage of the bus capacitor Cs also interferes with the miniaturization of the UPS.

SUMMARY OF THE INVENTION

It is therefore an object of the present invention to provide a power converter acting as an automatic voltage regulator (AVR) in a UPS. Without any line-frequency transformer and large capacitor, the power converter is able to convert an ac input voltage into a stable ac output voltage. During the operation period, only one of the three switches in the power converter operates at a high-frequency mode and other switches in the power converter operates at a low-frequency mode.

According to the foregoing object of the present invention, a power converter is provided. The power converter for converting an ac input voltage at an input terminal thereof into an ac output voltage at an output terminal thereof includes an energy-storing inductor, a first switching circuit coupled to the energy-storing inductor to selectively switch so that the input terminal of the power converter is coupled to the energy-storing inductor, a second switching circuit coupled to the energy-storing inductor and the first switching circuit to selectively switch so that a common terminal of the power converter is coupled to the energy-storing inductor; and a third switching circuit coupled to the energy-storing inductor, the first switching circuit and the second switching circuit to selectively switch so that the output terminal of the power converter is coupled to the energy-storing inductor.

According to the foregoing object of the present invention, a power converting method is provided. The power converting method is applied to a first switch circuit, a second switch circuit, a third switch circuit and an energy-storing inductor coupled to one another in parallel among an input terminal, a common terminal and an output terminal for converting an ac input voltage at the input terminal into an ac output voltage at the output terminal. The power converting method includes steps of: (a) switching the second switch circuit and the third switch circuit when the ac input voltage at the input terminal is higher than the ac output voltage at the output terminal so that the common terminal and the output terminal are coupled to two terminals of the energy-storing inductor respectively, and operating the first switch circuit at high frequencies, and (b) switching the first switch circuit and the third switch circuit when the ac input voltage at the input terminal is lower than the ac output voltage at the output terminal so that the input terminal and the output terminal are coupled to two terminals of the energy-storing inductor respectively, and operating the second switch circuit at high frequencies.

The foregoing and other features and advantages of the present invention will be more clearly understood through the following descriptions with reference to the drawings, wherein:

BRIEF DESCRIPTION OF THE DRAWINGS

FIG. 3(a) and FIG. 3(b) are sequentially from top to bottom a waveform comparison diagram of the ac output/input voltage, a current waveform diagram of the energy-storing inductor L, a waveform diagram of the ac input current, and a voltage waveform diagram of the energy-storing inductor L, when the power converter in FIG. 2 operates in the buck mode;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
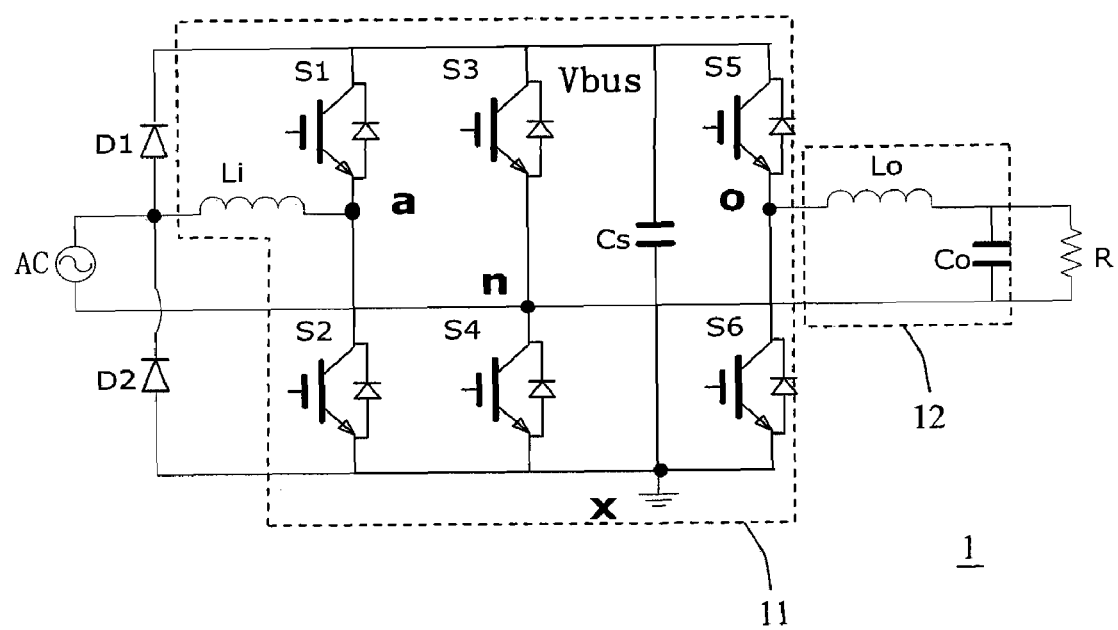
FIG. 1 is a partial circuit diagram showing an uninterruptible power supply (UPS) according to the prior art.
Figure 2:
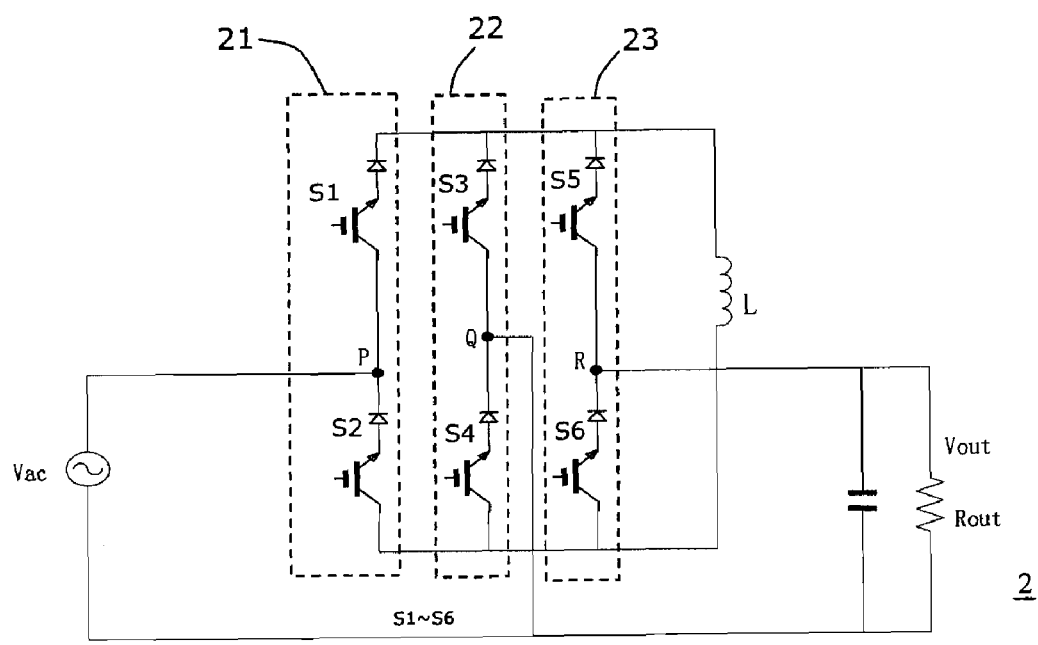
FIG. 2 is a circuit diagram showing a power converter according to one preferred embodiment of the present invention.

Please refer to FIG. 2, which is a circuit diagram showing a power converter according to one preferred embodiment of the present invention. The power converter 2 includes an energy-storing inductor L, a first switching circuit 21, a second switching circuit 22, and a third switching circuit 23. The energy-storing inductor L is coupled to the three switching circuits 21~23. In this embodiment, the energy-storing inductor L, the first switching circuit 21, the second switching circuit 22 and the third switching circuit 23 are coupled to one another in parallel.

In FIG. 2, the first switching circuit 21 has the input terminal P of the power converter 2, the second switching circuit 22 has the common terminal Q of the power converter 2, and the third switching circuit 23 has the output terminal R of the power converter 2. The input terminal P of the power converter 2 is connected to an ac input voltage Vac. The output terminal R of the power converter 2 is connected to one terminal of the load Rout, and the common terminal Q of the power converter 2 is connected to the other terminal of the load Rout. Besides, there exists a filter capacitor C being connected to the load Rout in parallel.

With the selective switching of the first switching circuit 21, the input terminal P of the power converter 2 is coupled to one terminal of the energy-storing inductor L. With the selective switching of the second switching circuit 22, the common terminal Q of the power converter 2 is coupled to one terminal of the energy-storing inductor L. With the selective switching of the third switching circuit 23, the output terminal R of the power converter 2 is coupled to one terminal of the energy-storing inductor L. Hence, the ac input voltage Vac at the input terminal P of the power converter 2 is converted into an ac output voltage Vout at the output terminal R thereof and is then outputted to the load Rout.

The first, second and third switching circuits are composed of at least a one-way switch, respectively. In the embodiment, the first switching circuit 21, the second switching circuit 22 and the third switching circuit 23 are respectively composed of two switch circuits connected to each other in series. In FIG. 2, the first switching circuit 21 includes a first switch circuit above the input terminal P and a second switch circuit below the input terminal P. The first switch circuit above the input terminal P is composed of a transistor S1 and a diode, and the second switch circuit below the input terminal P is composed of another transistor S2 and another diode.

Similarly, the second switching circuit 22 includes a third switch circuit above the common terminal Q and a fourth switch circuit below the common terminal Q. The third switch circuit above the common terminal Q is composed of a transistor S3 and a diode, and the fourth switch circuit below the common terminal Q is composed of another transistor S4 and another diode.

Finally, the third switching circuit 23 includes a fifth switch circuit above the output terminal R and a sixth switch circuit below the output terminal R. The fifth switch circuit above the output terminal R is composed of a transistor S5 and a diode, and the sixth switch circuit below the output terminal R is composed of another transistor S6 and another diode.

The power converter in FIG. 2 acts as an automatic voltage regulator (AVR), which is able to generate a full-wave rectifying current at the energy-storing inductor L, to convert the ac input voltage Vac at the input terminal P of the power converter 2 into an ac output voltage Vout at the output terminal R of the power converter 2, and then to output the ac output voltage Vout to the load Rout.

The operations of the switches in the power converter 2 of FIG. 2 during a buck mode and a boost mode are described below in detail.

(a) Buck Mode (a1) Positive Cycle

In this cycle, the switch S6 of the third switching circuit 23 is turned on with 100% duty cycle and the switch S5 thereof is open with almost 0% duty cycle. The switch S4 of the second switching circuit 22 is open with 0% duty cycle and the switch S3 thereof is turned on with 100% duty cycle. At this time, the first switching circuit 21 acts as a buck circuit and operates at a high-frequency PWM mode to generate the ac output voltage Vout with an enough amplitude.

(a2) Negative Cycle

In this negative cycle, the switching mode and the duty cycle of each switch above or below the midpoint (the input terminal, the common terminal and the output terminal) of each switching circuit are contrary to those in the mentioned positive cycle.

Figure 3B:

Please refer to FIG. 3(a) and FIG. 3(b), which are sequentially from top to bottom a waveform comparison diagram of the ac output/input voltage, a current waveform diagram of the energy-storing inductor L, a waveform diagram of the ac input current, and a voltage waveform diagram of the energy-storing inductor L, when the power converter in FIG. 2 operates in the buck mode. From the figures and the operations mentioned above, it is clear that there is only one switching circuit operating in PWM mode and the other two switching circuits are operating in input-line frequency mode when the power converter provided in the present invention is regulating the ac output voltage in the buck mode.

(b) Boost Mode (b1) Positive Cycle

In this cycle, the switch S1 of the first switching circuit 21 is turned on with 100% duty cycle and the switch S2 thereof is open with almost 0% duty cycle. The switch S5 of the third switching circuit 23 is open with 0% duty cycle and the switch S6 thereof is turned on with 100% duty cycle. At this time, the second switching circuit 22 acts as a boost circuit and operates at a high-frequency PWM mode to generate a full-wave rectifying current, i.e. the ac output voltage Vout with an enough amplitude.

(b2) Negative Cycle

Similarly, in this negative cycle, the switching mode and the duty cycle of each switch above or below the midpoint of each switching circuit are contrary to those in the mentioned positive cycle.

Figure 4A:
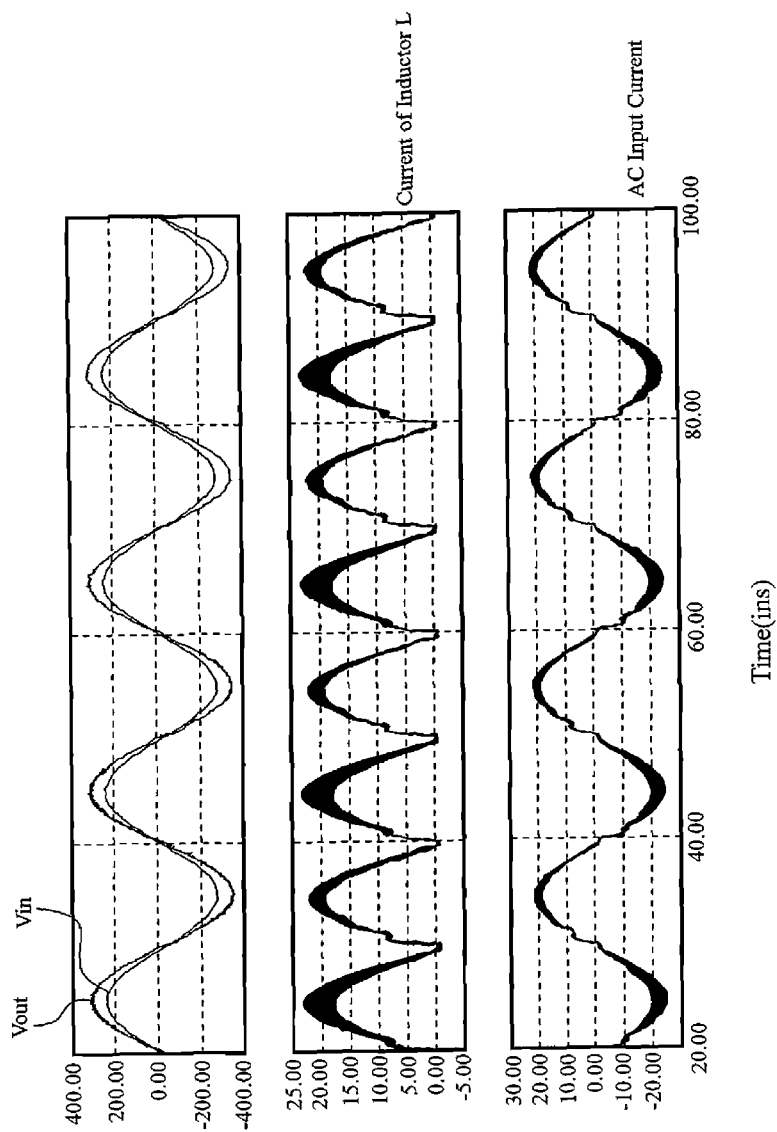
FIG. 4(a) and FIG. 4(b) are sequentially from top to bottom a waveform comparison diagram of the ac output/input voltage, a current waveform diagram of the energy-storing inductor L, a waveform diagram of the ac input current, and a voltage waveform diagram of the energy-storing inductor L, when the power converter in FIG. 2 operates in the boost mode.
Figure 4B:
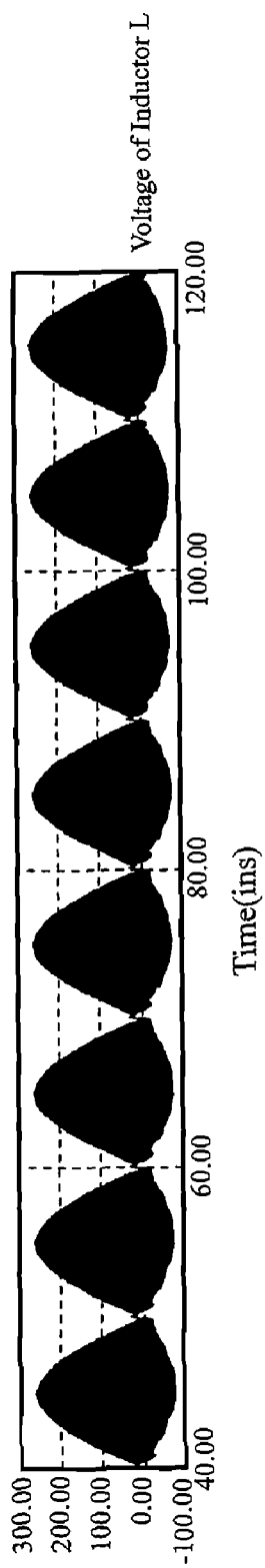

Please refer to FIG. 4(a) and FIG. 4(b), which are sequentially from top to bottom a waveform comparison diagram of the ac output/input voltage, a current waveform diagram of the energy-storing inductor L, a waveform diagram of the ac input current, and a voltage waveform diagram of the energy-storing inductor L, when the power converter in FIG. 2 operates in the boost mode. From the figures and the operations mentioned above, it is clear that there is only one switching circuit operating in PWM mode and the other two switching circuits are operating in input-line frequency mode when the power converter provided in the present invention is regulating the ac output voltage in the boost mode.

On the other hand, the first switching circuit 21, the second switching circuit 22 and the third switching circuit 23 will be operating at the input-line frequency if the ac input voltage is equal to the ac output voltage.

Figure 5:
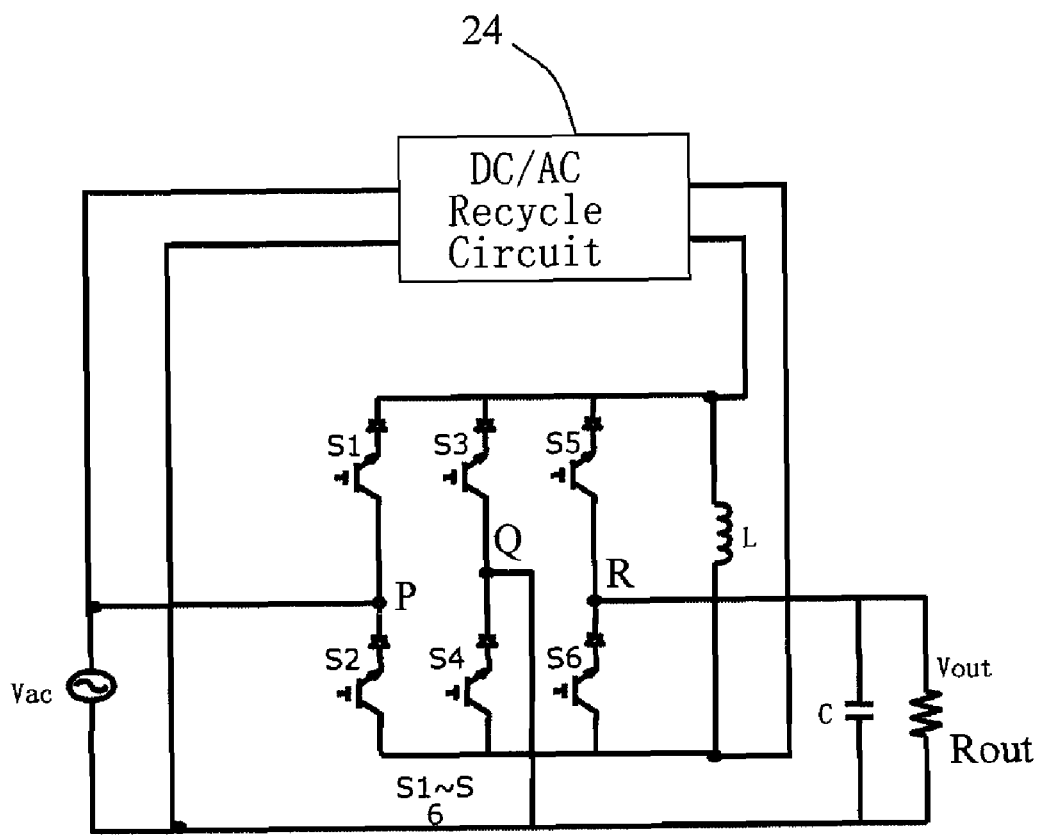
FIG. 5 is a circuit diagram showing a power converter according to another preferred embodiment of the present invention.

Please refer to FIG. 5, which is a circuit diagram showing a power converter according to another preferred embodiment of the present invention. If there exists an excess of energy in the energy-storing inductor L of the power converter 2 shown in FIG. 2, a dc/ac recycle circuit 24 can be coupled to the energy-storing inductor L and the switching circuits to recycle the excess of energy from the energy-storing inductor L to the ac input voltage Vac.

As mentioned before, the uninterruptible power supply (UPS) has two operation modes, i.e. (1) dc supply mode and (2) ac supply mode. The operations of the present power converter with reference to the two modes are described in detail as follows.

(1) DC Supply Mode

Figure 6A:
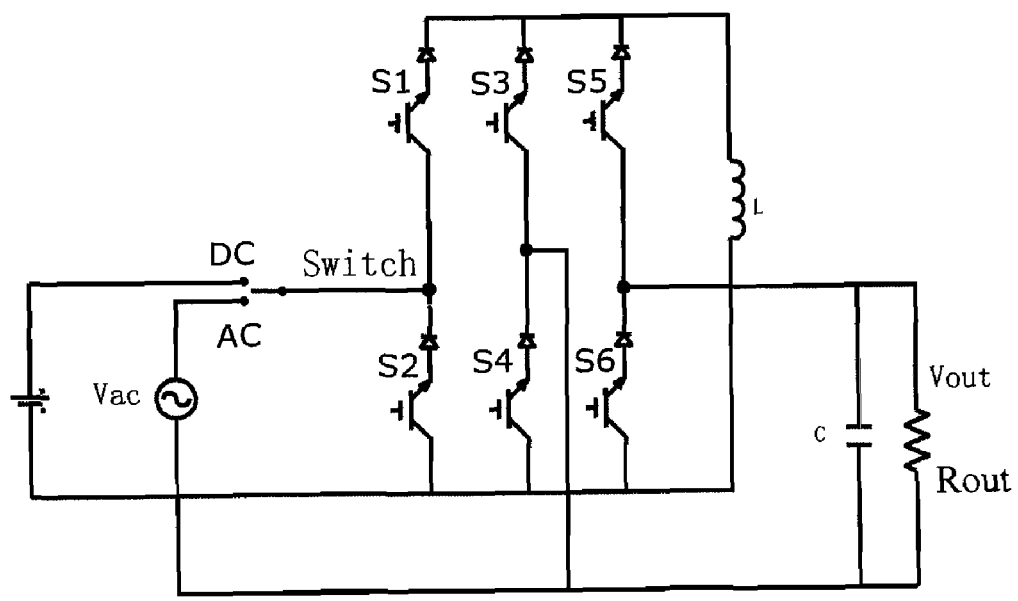
FIG. 6(a) is a circuit diagram showing a UPS making use of the power converter operating in dc supply mode according to the present invention.

Please refer to FIG. 6(a), which is a circuit diagram showing a UPS making use of the power converter operating in dc supply mode according to the present invention. In FIG. 6(a), the circuit elements the same as those in FIG. 2 are marked with the same numerical symbols. However, the difference the two figures is that a selecting switch Switch is coupled to the input terminal P for selecting from a dc input voltage DC and the ac input voltage Vac.

Under the circumstance of the ac input voltage Vac being abnormal and the dc input voltage DC being providing energy to the load Rout, the power converter acts as a buck converter when the ac output voltage Vout is lower than the dc input voltage DC. Moreover, the power converter acts as a boost converter when the ac output voltage Vout is higher than the dc input voltage DC.

(2) AC Supply Mode

Figure 6B:
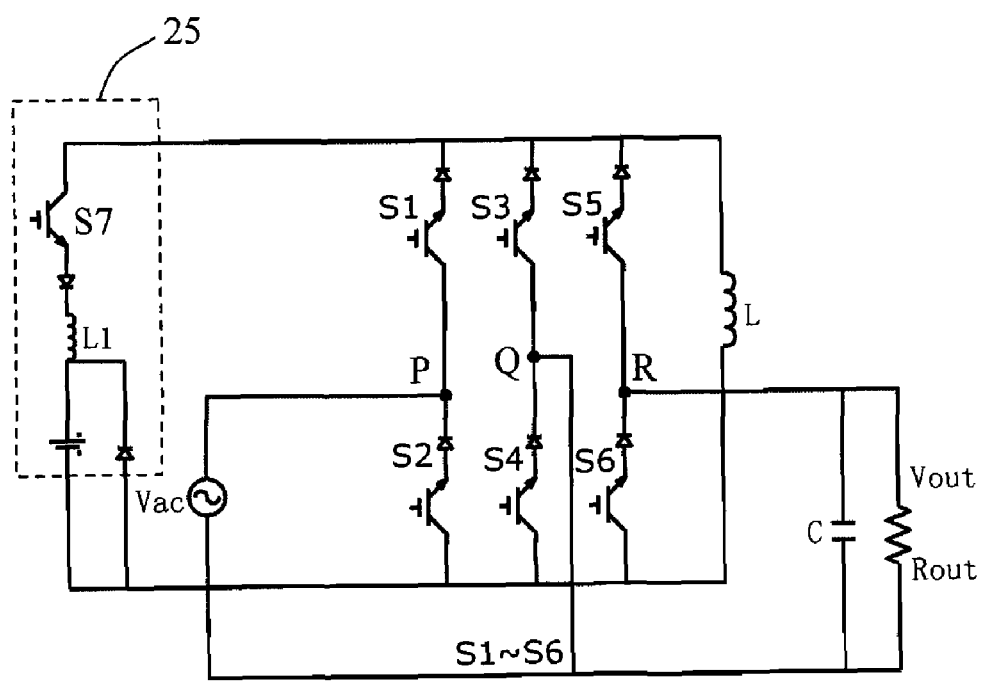
FIG. 6(b), which is a circuit diagram showing a UPS making use of the power converter operating in ac supply mode according to the present invention.

Please refer to FIG. 6(b), which is a circuit diagram showing a UPS making use of the power converter operating in ac supply mode according to the present invention. In FIG. 6(b), the circuit elements the same as those in FIG. 2 are marked with the same numerical symbols. However, the difference the two figures that a charging circuit 25 is coupled to the power converter.

Figure 7:
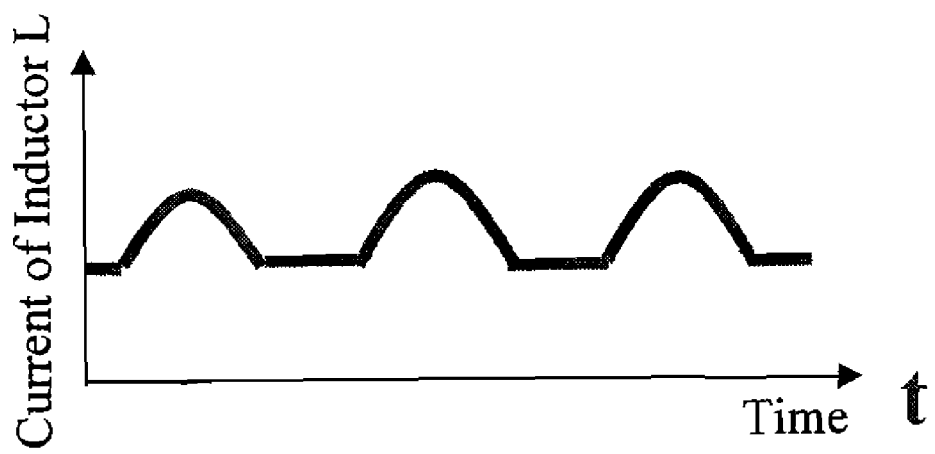
FIG. 7 is a waveform diagram showing a possible current of the energy-storing inductor L.

When the system is light-loaded, the reacted current at the input terminal P will increase because of the energy-storing inductor L. At this time, the charging circuit 25 generates a dc current to charge the system. On the other hand, there is only one switching circuit operating in PWM mode and the other two switching circuits are operating in input-line frequency mode. The switch loss will hence be relatively low. Therefore, the waveform of the current of the energy-storing inductor L is regulated on the basis of the load R. FIG. 7 shows a possible waveform of the current through the energy-storing inductor L.

In conclusion, the power converter provided in the present invention acts as an automatic voltage regulator (AVR) in a UPS. Without any line-frequency transformer and large capacitor, the power converter is able to convert an ac input voltage into a stable ac output voltage. At the same time of the operation period, only one of the three switches in the power converter operates at a high-frequency mode and other switches in the power converter operates at a low-frequency mode, so that the switching loss of the switches can be reduced remarkably.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A power converter for converting an ac input voltage at an input terminal thereof into an ac output voltage at an output terminal thereof, comprising:
   an energy-storing inductor;
   a first switching circuit coupled to the energy-storing inductor to selectively switch so that the input terminal of the power converter is coupled to the energy-storing inductor;
   a second switching circuit coupled to the energy-storing inductor and the first switching circuit to selectively switch so that a common terminal of the power converter is coupled to the energy-storing inductor; and
   a third switching circuit coupled to the energy-storing inductor, the first switching circuit and the second switching circuit to selectively switch so that the output terminal of the power converter is coupled to the energy-storing inductor, wherein the energy-storing inductor, the first switching circuit, the second switching circuit and the third switching circuit are coupled to one another in parallel.

2. The power converter as claimed in claim 1, wherein the input terminal of the power converter is further coupled to a selecting switch to select between a dc input voltage and the ac input voltage.

3. The power converter as claimed in claim 1, wherein the first switching circuit comprises a first switch circuit and a second switch circuit coupled thereto in series, and a first neutral point between the two switch circuits constitutes the input terminal of the power converter.

4. The power converter as claimed in claim 1, wherein second switching circuit comprises a third switch circuit and a fourth switch circuit coupled thereto in series, and a second neutral point between the two switch circuits constitutes the common terminal of the power converter.

5. The power converter as claimed in claim 1, wherein the third switching circuit comprises a fifth switch circuit and a sixth switch circuit coupled thereto in series, and a third neutral point between the two switch circuits constitutes the output terminal of the power converter.

6. The power converter as claimed in claim 1, wherein the first, second and third switch circuit comprise at least a one-way switch, respectively.

7. The power converter as claimed in claim 6, wherein the one-way switch comprises a diode and a transistor coupled thereto in series.

8. The power converter as claimed in claim 1, wherein the output terminal of the power converter is further coupled to a filter capacitor and a load.

9. The power converter as claimed in claim 1, wherein the energy-storing inductor and the switch circuits are further coupled to a dc/ac recycle circuit to recycle an energy from the energy-storing inductor to the ac input voltage.

10. A power converting method applied to a first switch circuit, a second switch circuit, a third switch circuit and an energy-storing inductor coupled to one another in parallel among an input terminal, a common terminal and an output terminal for converting an ac input voltage at the input terminal into an ac output voltage at the output terminal, comprising steps of:
   (a) switching the second switch circuit and the third switch circuit when the ac input voltage at the input terminal is higher than the ac output voltage at the output terminal so that the common terminal and the output terminal are coupled to two terminals of the energy-storing inductor respectively, and operating the first switch circuit at high frequencies; and
   (b) switching the first switch circuit and the third switch circuit when the ac input voltage at the input terminal is lower than the ac output voltage at the output terminal so that the input terminal and the output terminal are coupled to two terminals of the energy-storing inductor respectively, and operating the second switch circuit at high frequencies.

11. The power converting method as claimed in claim 10, wherein the step (a) further comprises steps of:
   (a1) switching the second switch circuit and the third switch circuit during a positive cycle of the ac input voltage so that the common terminal and the output terminal are coupled to a high-voltage terminal and a low-voltage terminal of the energy-storing inductor respectively; and
   (a2) switching the second switch circuit and the third switch circuit during a negative cycle of the ac input voltage so that the common terminal and the output terminal are coupled to the low-voltage terminal and the high-voltage terminal of the energy-storing inductor respectively.

12. The power converting method as claimed in claim 10, wherein the step (b) further comprises steps of:

(b1) switching the first switch circuit and the third switch circuit during a positive cycle of the ac input voltage so that the input terminal and the output terminal are coupled to a high-voltage terminal and a low-voltage terminal of the energy-storing inductor respectively; and (b2) switching the first switch circuit and the third switch circuit during a negative cycle of the ac input voltage so that the input terminal and the output terminal are coupled to the low-voltage terminal and the high-voltage terminal of the energy-storing inductor respectively.

* * * * *